May 16, 1950      G. E. KING ET AL      2,508,172
MOTOR SPEED CONTROL SYSTEM
Filed Dec. 12, 1945
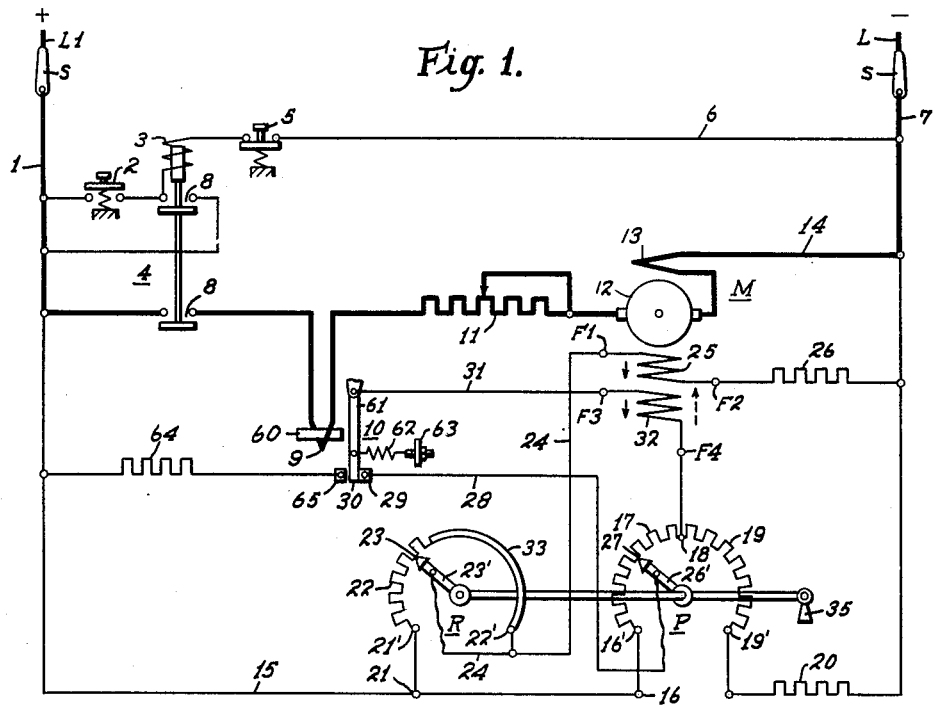
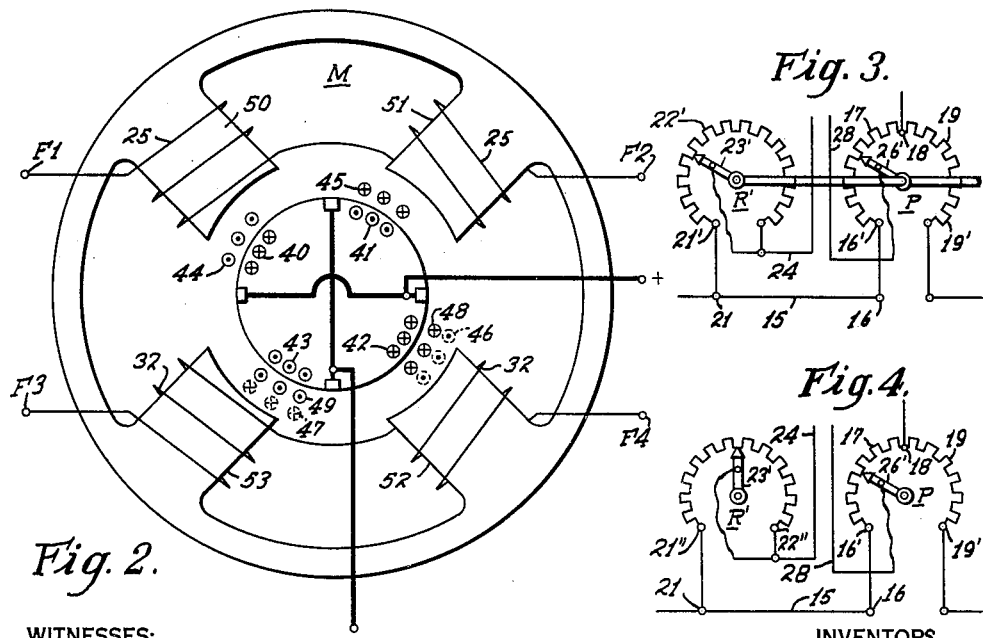
WITNESSES:
Edward Michaels
Nw. C. Goore
INVENTORS
George E. King,
Raymond W. Moore &
William R. Harding.
BY
Paul E. Friedemann
ATTORNEY Patented May 16, 1950

2,508,172

UNITED STATES PATENT OFFICE 2,508,172

MOTOR SPEED CONTROL SYSTEM

George E. King, Swissvale, Raymond W. Moore, Edgewood, and William R. Harding, Export, Pa., assignors to Westinghouse Electric Corporation, East Pittsburgh, Pa., a corporation of Pennsylvania Application December 12, 1945, Serial No. 634,552

6 Claims. (Cl. 318—390)

Our invention relates to electrical apparatus, and more particularly to a system of control in combination with the circuits of a direct-current motor.

A conventional, or standard, adjustable speed direct-current motor can be operated successfully over a four-to-one speed range by means of altering the field excitation from a given maximum value, depending on the size and rating of the machine, down to a given minimum value. This minimum value, for all practical purposes must not be decreased below a given per cent of the full excitation.

If any attempt is made to obtain a speed range of more than four-to-one: the speed regulation becomes bad; a condition of instability occurs because, for a weakening of the field to a lesser extent than some fair per cent of the full field excitation the residual flux becomes the major percentage of the total excitation; and the reactance voltage increases and, though the commutation voltage due to the interpoles increases in the same proportion, commutation difficulties arise. Some correction of the commutation difficulties may, of course, be obtained by the proper control of the excitation of the interpoles on the large machines. On the smaller machines space requirements do not permit the use of interpole.

One broad object of our invention is the provision of a wide range of speed, wider than heretofore obtained, for a direct-current motor by merely controlling the field excitation of the motor.

Another broad object of our invention is to limit the rate of acceleration of a direct-current motor when the field excitation control we provide is operated, as is usually the case, at a speed greater than a given relatively low speed.

Another object of our invention is to control the excitation of one half of the positive and negative poles of a machine independently of the excitation control, or absence of control if such be desirable, of the other half of the positive and negative poles.

A more specific object of our invention is the provision of a speed control of a wave wound direct-current motor of conventional design over an eight-to-one, and lesser speed range by our special manner of exciting the motor.

The objects recited are merely illustrative of the objects of our invention.

Other objects and advantages will become more apparent from a study of the specification and the drawing, in which:

Figure 1 is a diagrammatic showing of our control system;

Fig. 2 is a schematic showing of the arrangement of the field windings on a four-pole motor;

Fig. 3 is a modified showing of the excitation control for the respective groups of field windings selected for interdependent control in accordance with our invention; and Fig. 4 is a further modified showing of the excitation control for the respective groups of field windings selected for independent control in accordance with our invention.

In the drawing, M designates, so far as the design of the machine is concerned, a conventional direct-current motor having a two-circuit armature winding, that is, a wave-wound armature.

We provide this motor with two field windings 25 and 32. The windings 25 are disposed on the two upper poles, namely, in the first and second quadrants, respectively, of the four-pole machine shown in Fig. 2, whereas the field windings 32 are disposed on the two lower poles, namely, in the third and fourth quadrants, respectively, of the machine. Our control and field arrangement is applicable to machines having more than four poles, but to simplify and clarify the discussion a four-pole machine is used in the showing of Fig. 2.

In the field windings 25, the excitation is controlled in substantially normal manner by means of the rheostat R, but the arrangement is such that the excitation cannot be reduced below a given value. To assure this we connect a permanent resistor 26 in series with field winding 25. The selection of the resistance value of resistor 26, in relation to the resistance value of field winding 25 and the rheostat R, is so made that conventional field coils, namely, field coils of the type coming off a production line in a factory, may be used on similarly standard pole pieces 50 and 51, and that the excitation of field windings 25 is not reduced below forty per cent of full field current even though all the resistor sections 22 of the rheostat are shunted. In actual use we have found that a forty per cent change in field excitation of the field windings 25 is the preferred range of field control for the excitation of the field windings 25.

On the similarly standard pole pieces 52 and 53, we mount field coils as near the same as production line manufacture provides them. The field windings 32, considered without relation to the manner of their use, that is, considered without our control, are exactly like the field windings 25. Since the magnetic frame is of standard design and the pole pieces 50, 51, 52 and 53 are all selected to have like mechanical and magnetic characteristics, it is apparent that the direct-current motor per se may be (but does not have to be) and preferably is selected to be a standard production-line built wave wound direct-current machine.

For the control of the field windings 32, we provide a potentiometer P having its resistor sections connected in series with resistor 20. This series circuit is connected directly across the direct-current lines 1 and 7. The field windings 32 are in a circuit from the movable, or sliding, contact 26' of the potentiometer, junction 27, conductor 28, stationary contact 29 and the movable contact 30 of the acceleration control relay 10, conductor 31, junction $F_3$, field winding 32, junction $F_4$, the neutral junction 18 of the potentiometer P, through half, some, or none of the resistor sections of the potentiometer, depending on the position of arm 26', back to the contact junction 27.

The resistance value of the resistor 26 is preferably so chosen that when all the resistor sections of the rheostat R are shunted and the field windings 32 are connected across points 16' and 18, that the field current in windings 25 and 32 is substantially equal and acting in the same sense as indicated by the full line arrows at the right of the field windings 25 and 32.

To gain a fuller appreciation of our contribution to the art, a study of typical operating cycles may be helpful.

If the main leads $L_1$ and $L_2$ are energized and switch S is closed, a circuit is established from the positive conductor 1 through conductor 15, junctions 16 and 16', resistor sections 17, neutral junction 18, resistor sections 19, junction 19' and resistor 20 to the negatively energized conductor 7.

The movable arms 23' and 26' of the rheostat R and potentiometer P, respectively, are mechaically coupled to the shaft 34 so that they may be actuated together and in the same angular sense by the actuating element 35.

For some applications, it may be desirable to vary the excitation of field windings 25 from full value down to sixty per cent of full value during the full angular movement of the control element 35, while at the same time the excitation of field windings 32 is varied from their full positive value through zero to their full negative value. This is shown in Fig. 3 where the arm 23' is arranged to swing over resistor sections, of the rheostat R', disposed over the full arc through which the arm 23' may be caused to swing.

For still other applications, it may be desirable that the excitation of field windings 25 be not altered at all, or, if alteration is desired, that such alteration proceed independently of the control of the field windings 32. The showing in Fig. 4 takes care of both of these latter two contingencies. Obviously arm 23' may be fixed on junction 21'', or junction 22'', or in the position shown while the arm 26' is operated to control the excitation of field windings 32, or arm 23' may be moved independently while movements of arm 26' are being made.

For still other applications, for example, where a speed range of eight-to-one is not needed but a four-to-one speed range suffices, the rheostat R is not needed but the field windings 25 may be connected directly across the line, or through a resistor, as 26, as desired.

Assuming that at the moment the attendant wishes to start the motor, and again referring to Figs. 1 and 2, the arms 23' and 26' are on the junctions 21' and 16', respectively, then the field windings 25 and 32 are excited at their maximum value. If the attendant now actuates starting switch 2, a circuit is established from positive conductor 1 through switch 2, actuating coil 3 of the contactor 4, stop switch 5, and conductor 6 to the negative conductor 7.

Operation of contactor 4 closes contacts 8 and 8'. The closure of contacts 8 provides a holding circuit for contactor 4 whereas the closure of contacts 8' establishes a circuit for the motor armature. This circuit extends from conductor 1 through contacts 8', actuating coil 9 of the field accelerating relay 10, motor starter 11, the wave-wound armature winding 12 of motor M, the series field winding 13 and conductor 14 to conductor 7. The series field winding 13 is normally of few ampere turns and is disposed on all the pole pieces but is not shown in Fig. 2, so as to simplify the theoretical explanations.

The starter 11 is not an essential part of our invention, and when cross-the-line starting is used, as is often the case, is omitted.

For the assumed position of the arms 23' and 26', both field windings 25 and 32 are energized at maximum value and in the same sense. The direction of the armature currents in the armature, conductors will thus be as indicated at 40, 41, 42 and 43. The polarities of the pole pieces 50, 51, 52 and 53 adjacent the armatures will thus correspond to south, S, north, N, south, S, and north, N, respectively. The motor will thus start as a substantially conventional four-pole machine. The counterelectromotive forces induced in the conductors under the various pole pieces will be as indicated at 44, 45, 46, and 47.

As the arms 23' and 26' are, let us say, slowly moved in the clockwise direction, the excitation of both field windings 25 and 32 is decreased and the motor speeds up. For the showing in Fig. 1, the decrease in excitation in the field windings 32 is proportional to the decrease in field winding 25. When the arm 23' just begins to contact the conducting strip 33, the excitation in both field windings has been decreased to, say, sixty per cent of their full value. For further clockwise movements of arm 23', the excitation of field windings 25 is not altered but such is not the case for field windings 32.

When junction 27 coincides with junction 18, the excitation in windings 32 is zero. The counterelectromotive force in the conductors under pole pieces 52 and 53 is thus absent.

As the clockwise movement of arm 26' continues from junction 18 in the clockwise direction toward junction 19', the excitation of field windings 32 becomes progressively more negative, as indicated by the broken arrow adjacent field windings 32 shown in Fig. 1. The counterelectromotive force of the conductors cutting flux under pole pieces 52 and 53, since these poles are north and south poles, respectively, is now as indicated at 48 and 49. It will be noted by comparing the showings at 42 and 48, and 43 and 49 that the effect is as if the applied voltage had been increased. Since the motor must itself supply this increase in applied voltage, the power remains constant.

A somewhat more rigorous analysis is as follows.

Let $E_{50}$, $E_{51}$, $E_{52}$, and $E_{53}$ represent, respectively, the voltages in the conductors cutting an average flux $\phi_{50}$, $\phi_{51}$, $\phi_{52}$, $\phi_{53}$ of the corresponding poles.

The relation between speed, N, and flux, $\phi_n$, voltage applied, V, and the resistance drop IR is $$N = \frac{V-IR}{\phi_n} K$$

where K is a proportionality constant.

But the total net generated voltage $Eg = V - IR$,
The net generated voltage, $$Eg = E_{50} + E_{51} + E_{52} + E_{53}$$

algebraically added.
The net flux, $$\phi n = \phi_5^0 + \phi_{51} + \phi_{52} + \phi_{53}$$

algebraically added.
Therefore $$N = \frac{E_g K}{\phi_n}$$

Since the selection of the resistor 26 is such that preferably sixty per cent of full field excitation is maintained in windings 25 even when arm 23' is so moved that junctions 23 and 22' are in coincidence, the fluxes $\phi_{50}$ and $\phi_{51}$ are always maintained at a much higher value than the residual and, since the fluxes $\phi_{52}$ and $\phi_{53}$ are easily controlled to the desired value by the potentiometer circuit, stable speed control can be obtained over a wide speed range, in fact over a much wider speed range than was heretofore possible.

That the speed control is stable is apparent from the fact that the armature conductors are at all times under so-called "stiff fields." Thus the top poles are always maintained at a high value of excitation and therefore carry flux many times the residual flux. The bottom pair of poles are maintained at a definite value of flux regardless of residual, since the excitation can be made positive or negative by means of the potentiometer circuit. Therefore, the effect of residual is made negligible.

The effect of armature reaction ampere turns is to reduce the net flux under each pole. In a standard machine when operating at a value of excitation where the effect of armature reaction is maximum, the speed may increase with increase in load and a condition of instability will result. In this machine the effect of armature reaction tends to be canceled out, since it still reduces the net flux under each pole, but now one pair is cumulative and one pair is differential. Therefore the reduction in flux in the cumulative direction tends to be affected by the reduction in the differential direction.

To prevent the possibility of excessive negative excitation of field windings 32, and to thus fix the maximum motor speed, we connect resistor 20 in series with section 19 of potentiometer P.

In our arrangement, the windings 25, namely, the windings whose excitation is varied only, say, over no more than a forty per cent range of full excitation, are placed on the two top poles 50 and 51, so that the magnetic pull of these poles, acting against the bottom poles whose pull is varied over a large range, will be counteracted by the weight of the armature. The effect on the motor bearings will thus be more nearly equalized even though the excitation of the windings 32 is varied as heretofore explained.

In practice, the attendant never troubles himself to so actuate the arms 23' and 26' from one speed setting to another, say, higher speed setting that excessive accelerating currents are avoided. With our control, it is not necessary to burden the attendant with any knowledge of the control nor the manner of its actuation to prevent excessive accelerating currents.

If the attendant throws the arms 23' and 26' from the position shown through an angle of 120° in the clockwise direction, the maximum accelerating currents obtained is limited by the relay 10. This relay 10 has a coil 9 energized by the armature current. The magnetic circuit includes a core 60 about which the coil 9 is disposed and an armature pivoted so as to be moved against the core 60. The armature is spring biased away from the core by the spring 62, the tension of which is adjusted by the adjusting means 63.

The armature carries the movable contact 30, connected to conductor 31, and the armature is so disposed that contact 30 may make contact either with the stationary contact 29 or the stationary contact 65. The spring adjustment is so made that the armature moves the contacts 30 and 65 in engagement at a given overload current, for example 125% overload, and again releases the armature as soon as a lower overload value, for example, 110% overload, is obtained.

During motor acceleration, therefore, that is, on field weakening, as soon as the overload current exceeds, say, 125% full load, contacts 30 and 65 are engaged. When this takes place, the field circuit for field winding 32 may be traced from conductor 1 through resistor 64, contacts 65 and 30, conductor 31, field 32, resistor sections 19, and resistor 20 to conductor 7.

When relay 10 operates as just explained, the excitation of field winding 32 is cumulative to the excitation of field winding 25, as indicated by the full-line arrows to the left of these windings, as shown in Fig. 1, and this is so regardless of whether field windings 32 may have been positively energized or negatively energized just prior to the operation of relay 10. In any event, the total motor excitation is increased. As a result, the armature current drops. As soon as it drops to, say 110% full load, the armature of relay 10 is released and contacts 29 and 30 are brought into engagement. The cycle then repeats. Relay 10 is thus a fluttering relay and effects its control action as long as the need for the limitation of the accelerating current continues.

The resistor 64 is selected to be of low ohmic value to thus, in conjunction with resistor 20, limit the maximum possible short circuit current through the arc on the contacts of relay 10 when the arm 26' is in the maximum speed position.

The resistor 64 may in some applications be not needed where the resistance value of resistor 20 can be so selected that the blow-out coil on relay 10 will properly extinguish the arc.

While we have stressed the use of standard, or conventional, elements of our machine, the arrangement and use of the fields 32 in relation to the fields 25 is by no means standard and in this sense our machine is certainly a special machine. Further, while we have to a large extent burdened the control with the duty of obtaining the novel results, this manner of solving the problem is to our view merely a practical economical solution but is not an only solution of the problem.

Clearly, others, particularly after having had the benefit of our teachings, may devise other means of solving the problem, as, for instance, by utilizing a more radical redesign of the machine with the consequent use of a simpler control.

We, therefore, do not wish to be limited to the particular showing made, but wish to be limited only by the claims hereto appended.

We claim as our invention:

1. In an electric system of control, in combination, a direct-current motor having an even number of poles greater than two arranged in pairs and having an armature winding including the necessary armature conductors in the surface of the armature, means for applying voltage to the armature winding, means for exciting one pair of poles in a given sense so that the counter-electromotive force produced by the armature conductors cutting flux under this said one pair is in opposition to the voltage applied to the armature, means for varying the excitation of another pair of poles from a given positive value to a given negative value whereby the counter-electromotive force produced by the armature conductors cutting flux under this said second pair of poles is in opposition to the applied voltage when the excitation of the second pair of poles is positive and is additive to the applied voltage when the excitation of the second pair of poles is negative, and means for altering the excitation of the second pair of poles as a function of the armature current of the motor.

2. In an electric system of control, in combination, a direct-current motor having an even number of poles greater than two arranged in pairs and having an armature winding including the necessary armature conductors in the surface of the armature, means for applying voltage to the armature winding, means for exciting one pair of poles in a given sense so that the counter-electromotive force produced by the armature conductors cutting flux under this said one pair is in opposition to the voltage applied to the armature, means for varying the excitation of this said one pair of poles over a given range, means for varying the excitation of another pair of poles from a given positive value to a given negative value whereby the counterelectromotive force produced by the armature conductors cutting flux under this said second pair of poles is in opposition to the applied voltage when the excitation of the second pair of poles is positive and is additive to the applied voltage when the excitation of the second pair of poles is negative, and means for altering the excitation of the second pair of poles as a function of the armature current of the motor.

3. In an electric system of control, in combination, a direct-current motor having four poles and having a wave-wound armature, means for applying voltage to the armature to accelerate the motor, means for exciting two adjacent poles so as to make them positive and negative poles respectively, means for varying the excitation of the other two poles from a given maximum positive value to a given maximum negative value so that the polarity of the pole of the second two poles disposed adjacent the negative pole of the first two poles changes from a given positive value to a given negative value and that the polarity of the pole of the second two poles disposed adjacent the positive pole of the first two poles changes from a given negative value to a given positive value, and means responsive to a predetermined rise in the armature current for exciting the said other two poles to a given positive value regardless of whether said other two poles are at the time of such predetermined rise of armature current positively energized or negatively energized.

4. In an electric system of control, in combination, a direct-current motor having four poles and having a wave-wound armature, means for applying voltage to the armature to accelerate the motor, means for exciting two adjacent poles so as to make them positive and negative poles respectively, means for varying the excitation of said two adjacent poles from a given maximum value to no less than forty per cent of said maximum value but preferably to no less than sixty per cent of said maximum value, means for varying the excitation of the other two poles from a given maximum positive value to a given maximum negative value so that the polarity of the pole of the second two poles disposed adjacent the negative pole of the first two poles changes from a given positive value to a given negative value and that the polarity of the pole of the second two poles disposed adjacent the positive pole of the first two poles changes from a given negative value to a given positive value, and means responsive to a predetermined rise in the armature current for exciting the said other two poles to a given positive value regardless of whether said other two poles are at the time of such predetermined rise of armature current positively energized or negatively energized.

5. In an electric system of control, in combination, a substantially standard four-pole direct-current motor having a wave-wound armature and having substantially standard like field coils on the pole pieces, means for supplying a given voltage to the armature winding to operate the motor, field control means for varying the excitation of the two top poles over a given range, the range of variation being from the full, or one hundred per cent, value to no less than forty per cent of full value, but preferably to no less than sixty per cent of full value, second field control means for varying the excitation of the two bottom poles, the variation caused by said first and second field control means being such that the poles of the motor are alternately north and south poles, part of said second field control means for varying the excitation of the lower two poles from the given positive lower percentage value through zero to a negative value of substantially seventy-five per cent, in absolute value, of said full excitation so that the polarity of the bottom poles is changed, and control means responsive to the motor armature current for exciting the bottom poles to a given positive value regardless of the sense of the excitation of the bottom poles at the instant said last-named control means.

6. In an electric system of control, in combination, a substantially standard four-pole direct-current motor having a wave-wound armature and having substantially standard like field coils on the pole pieces, means for supplying a given voltage to the armature winding to operate the motor, field control means for varying the excitation of the two top poles over a given range, the range of variation being from the full, or one hundred per cent, value to no less than forty per cent of full value, but preferably to no less than sixty per cent of full value, second field control means interconnected with the first field control means for similarly and proportionately varying the excitation of the two bottom poles, the variation caused by said first and second field control means being such that the poles of the motor are alternately north and south poles, part of said second field control means for varying the excitation of the lower two poles from the given positive lower percentage value through zero to a negative value of substantially seventy-five per cent, in absolute value, of said full excitation so that the polarity of the bottom poles is changed, and control means responsive to the motor armature current for exciting the bottom poles to a given positive value regardless of the sense of the excitation of the bottom poles at the instant said last-named control means.

GEORGE E. KING.
    RAYMOND W. MOORE.
    WILLIAM R. HARDING.

REFERENCES CITED

The following references are of record in the file of this patent:

UNITED STATES PATENTS

| Number | Name | Date |
|---|---|---|
| 606,407 | Dobbie | June 28, 1898 |
| 790,569 | Hemingway | May 23, 1905 |
| 1,255,400 | Ferris | Feb. 5, 1918 |
| 1,407,958 | Stirk | Feb. 28, 1922 |
| 1,691,910 | Crouse et al. | Nov. 13, 1928 |
| 1,742,752 | Cady | Jan. 7, 1932 |